US008034279B2

(12) United States Patent
Dimter et al.

(10) Patent No.: US 8,034,279 B2
(45) Date of Patent: Oct. 11, 2011

(54) METHOD AND DEVICE FOR MANUFACTURING A THREE-DIMENSIONAL OBJECT

(75) Inventors: Marc Dimter, Kornwestheim (DE);
Ralph Mayer, Kornwestheim (DE);
Ludger Hümmeler, Lennestadt (DE);
Rainer Salzberger, Wessling (DE);
Juha Kotila, Turku (FI); Tatu Syvänen, Raisio (FI)

(73) Assignee: EOS GmbH Electro Optical Systems, Krailling (DE)

( * ) Notice: Subject to any disclaimer, the term of this patent is extended or adjusted under 35 U.S.C. 154(b) by 615 days.

(21) Appl. No.: 12/045,483

(22) Filed: Mar. 10, 2008

(65) Prior Publication Data

US 2008/0241392 A1    Oct. 2, 2008

(30) Foreign Application Priority Data

Mar. 27, 2007    (DE) .......................... 10 2007 014 683

(51) Int. Cl.
*B29C 35/08*    (2006.01)
*B29C 41/02*    (2006.01)

(52) U.S. Cl. ......... 264/401; 264/113; 264/308; 264/497

(58) Field of Classification Search ................... 264/113, 264/308, 401, 497
See application file for complete search history.

(56) References Cited

U.S. PATENT DOCUMENTS

| 5,155,324 | A | 10/1992 | Deckard et al. |
| 5,534,104 | A | 7/1996 | Langer et al. |
| 6,366,825 | B1 | 4/2002 | Smalley et al. |
| 6,676,892 | B2 | 1/2004 | Das et al. |
| 6,677,554 | B2 | 1/2004 | Darrah et al. |
| 2004/0099996 | A1* | 5/2004 | Herzog .................. 264/401 |
| 2005/0242473 | A1* | 11/2005 | Newell et al. ............. 264/497 |

FOREIGN PATENT DOCUMENTS

| DE | 4233812 C1 | 11/1993 |
| DE | 10112591 A1 | 10/2001 |
| DE | 10042134 C2 | 6/2003 |
| EP | 0429196 B1 | 5/1991 |
| EP | 0590956 A1 | 4/1994 |
| EP | 1 419 836 | 5/2004 |
| GB | 2378150 A * | 2/2003 |
| JP | 2003-136604 A | 5/2003 |
| WO | 01/93786 | 12/2001 |
| WO | 2004/056509 A1 | 7/2004 |

* cited by examiner

*Primary Examiner* — Leo B Tentoni
(74) *Attorney, Agent, or Firm* — McDonnel Boehnen Hulbert & Berghoff LLP

(57) ABSTRACT

A method for manufacturing a three-dimensional object by successively solidifying layers of a building material at positions in the respective layer corresponding to the cross-section of the object is provided, wherein at least a partial region of a layer is solidified such that a pattern is generated, which pattern contains a plurality of substantially parallel solidification lines (V, S), and at least a partial region of a subsequent layer is exposed such that a pattern is generated, which pattern contains a plurality of substantially parallel solidification lines (V, S) that are rotated with respect to the solidification lines of the pattern of the previous layer by an angle ($\alpha$) that differs from 180°, 90° and 45°.

20 Claims, 3 Drawing Sheets

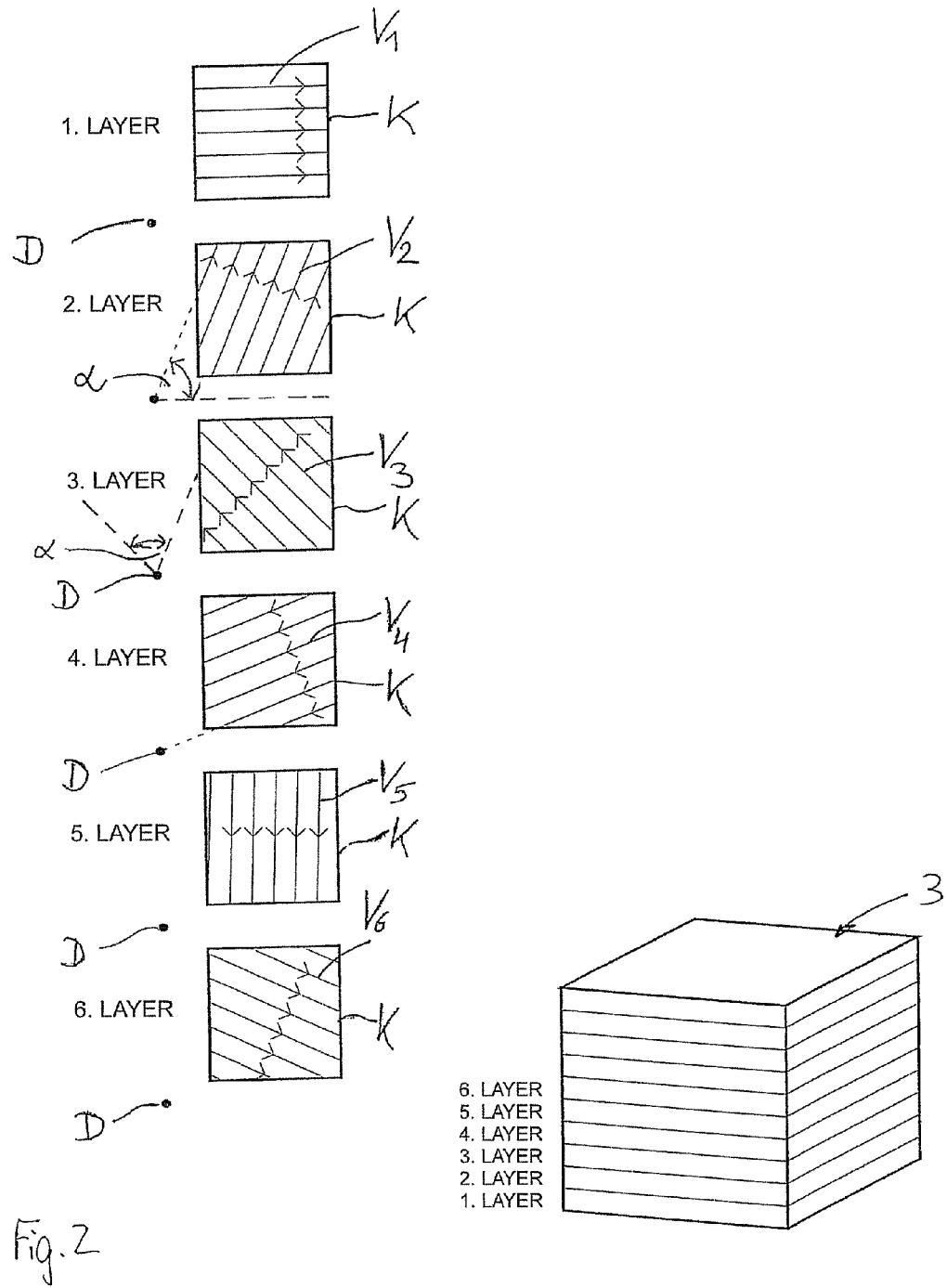

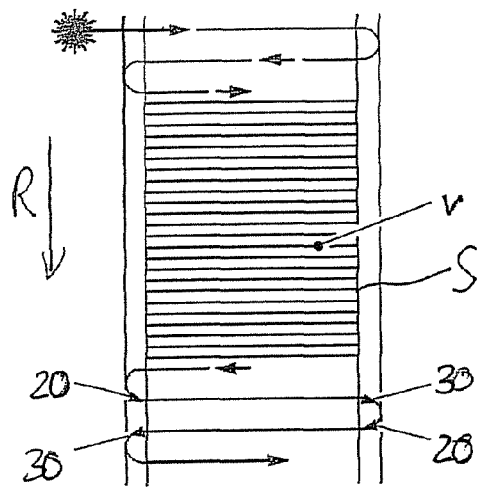
Fig.4
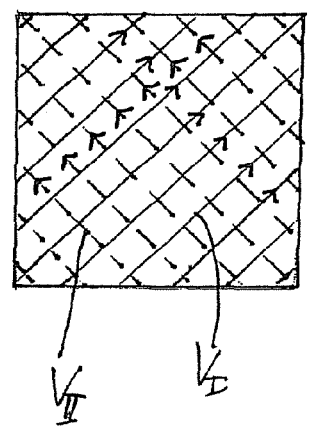
Fig.5
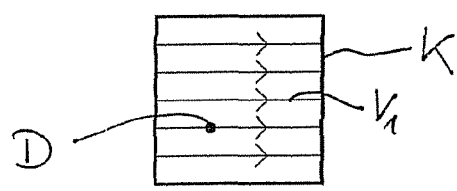
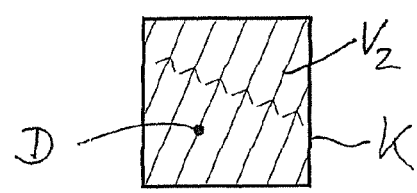
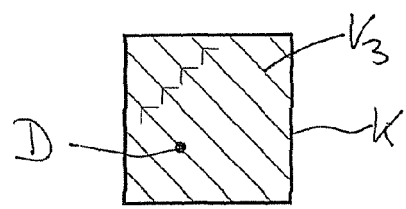
Fig.6

METHOD AND DEVICE FOR MANUFACTURING A THREE-DIMENSIONAL OBJECT

BACKGROUND OF THE INVENTION

The invention is related to a method and a device for manufacturing a three-dimensional object by a successive linear solidification of layers of a building material at positions in the respective layer corresponding to the cross-section of the object.

In laser sintering as well as in stereolithography and other related layer-wise manufacturing methods there are known various exposure patterns for filling regions, i.e. regions that are located in the respective layer inside of the contour defining the outline of the object.

In particular in order to minimize shrinkage effects and residual stress there have been developed exposure patterns that divide the area to be exposed into partial areas and expose these in differing sequences if necessary. Such exposure patterns are for example described in EP 0 429 196 B1, DE 42 33 812 C1 for stereolithography and in DE 100 42 134 C2 for laser sintering. Typically, the direction of the exposure vectors is rotated by 90° from layer n to layer n+1, leading to the same exposure orientation in each second layer. Also in electron beam sintering special exposure methods such as a helical or a meandering exposure of partial regions are used as described in WO 2004/056509.

From EP 0 590 956 A1 an exposure method for stereolithography is known, in which a light beam is directed across a layer in a plurality of vectors that are in parallel, wherein the direction of the vectors changes from one layer to the successive layer by 180°, 90° or 45°. These methods have disadvantages. In each layer material properties are created having a preferred orientation or for an exposure with crossing directions two preferred orientations. An anisotropy that results from a numerous repetition of few exposure directions leads to a spoiling of the mechanical properties of the whole part. Also the quality of the surface may be affected, e.g. pore formation may occur.

Moreover, there are known further exposure methods for laser sintering—mainly in order to avoid warpage—such as a spiral exposure as in U.S. Pat. No. 6,676,892 B2 or an onion-ring-like exposure as described in DE 101 12 591 A1. These methods vary the exposure directions within a layer, however, typically repeat the same exposure direction at many positions in layers that lie one on top of the other. Therefore, these methods have similar disadvantages.

SUMMARY OF THE INVENTION

It is an object of the present invention to provide a method for manufacturing a three-dimensional object and a device for performing the method, wherein the mechanical properties of the manufactured objects are improved.

The method according to the invention has the advantage that the formation of stress in the part is homogenized. Moreover, transitions of the partial areas or starting points for the exposure of partial areas are arranged such that they do not form any lines or areas in the object. Thereby, weak spots are avoided and tensions are reduced and/or homogenized.

The mechanical properties and the exactness of an object that is formed in such a way are improved.

Further features and advantages arise from the description of an embodiment based on the figures of which:

BRIEF DESCRIPTION OF THE DRAWINGS

FIG. 2 shows a schematic representation of an embodiment of steps of the method;

FIG. 3 shows a schematic representation of an object having layers that were exposed according to the steps of FIG. 2;

FIG. 4 shows a schematic representation of a modified exposure type for a single layer;

FIG. 5 shows a schematic representation of a further modified exposure type for a single layer;

FIG. 6 shows a modification of the method shown in FIG. 2.

DETAILED DESCRIPTION OF THE PREFERRED EMBODIMENTS

Figure 1:
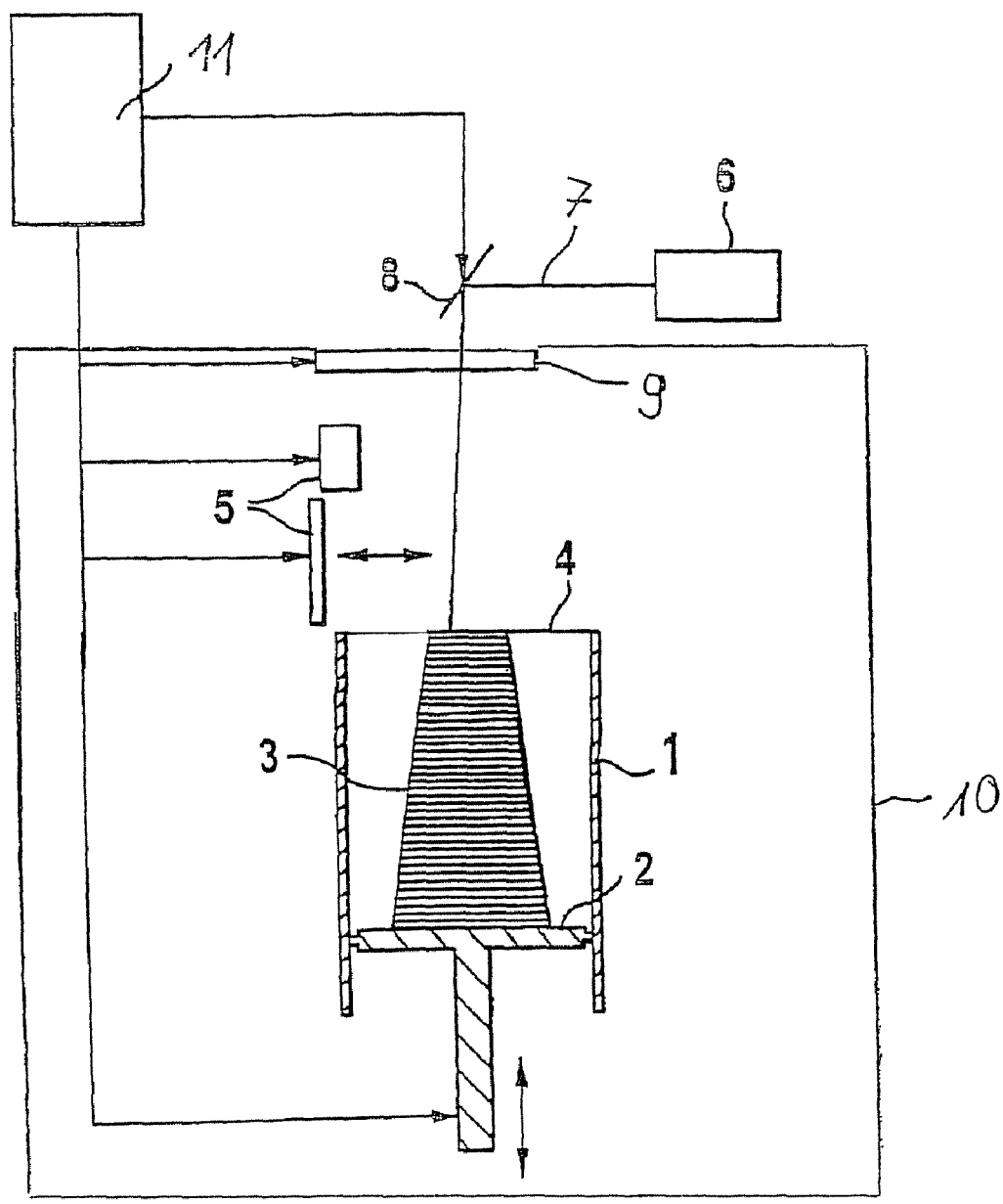
FIG. 1 shows an embodiment of the device.

FIG. 1 shows a laser sintering device as an embodiment of a device for a layer-wise manufacturing of a three-dimensional object. The laser sintering device comprises the container 1, which is open to the top, having therein a support 2, which can be moved in a vertical direction and supports the object 3 to be manufactured. The support 2 is positioned in a vertical direction such that at each time a layer of the object to be solidified lies in a working plane 4. Further, an application device 5 is provided for applying the building material in powder form that is to be solidified by means of electromagnetic radiation. Furthermore, the device comprises a laser 6. The laser beam 7 that is generated by the laser 6 is directed to a window 9 by a deflection device 8. The window 9 lets the laser beam pass through into the process chamber 10 and focuses it on a pre-determined point in the working plane. Usually a focusing optics (not shown) is provided. The deflection device 8 consists for example of two galvanometer mirrors that can deflect the beam to any point of the working plane 4. Further, a control unit 11 is provided, by which the components of the device are controlled in a coordinated way in order to perform the building process. In particular, the control unit contains a control for deflecting and, if necessary, for modulating the laser beam in accordance with a desired exposure pattern.

The three-dimensional object is generated layer by layer by a solidification of the building material in powder form by means of the laser beam at the positions in the layer that correspond to the respective cross-section of the object. All laser sinterable powders may be used as building material in powder form. However, the method is particularly suited for the laser sintering and laser melting, respectively, of metal powder.

A first embodiment of the method is shown in FIGS. 2 and 3. A first layer, which need not necessarily be the very first layer of the object to be formed, is exposed such that the laser beam is led across the layer in a plurality of parallel vectors $V_1$ in the filling region within the contour K that defines the outline of the object, wherein the powder is solidified. In a subsequent second layer the laser beam is led across the layer in parallel vectors $V_2$, wherein the vectors $V_2$ together with the vectors $V_1$ of the first layer include an angle α of 67°. There, the center of rotation D lies outside of the region to be solidified. From the third layer to the sixth layer, which is shown as an example, the direction of the vectors $V_3$ to $V_6$ in each case is rotated by an angle α=67° with respect to the previous layer. Thus, the exposure pattern is changed such that in the present case the orientation of the exposure vectors would be repeated only after 360 steps. Further, only after 18 layers there occurs an orientation that differs from an already used orientation by less than 10°. Thereby, in the object that is shown in FIG. 3 the formation of tensions is homogenized and no lines or areas do form, which constitute weak points in the object. By the rotating exposure a brittleness of the part is prevented and thereby the mechanical stability is increased.

Moreover, the start positions of the exposure vectors always are at different positions from layer to layer. Thereby also an improvement of the surface of the object that was formed results. For instance, at the surface no Moiré patterns occur, which originate from a repetition of exposure directions.

In a modification, the layer is exposed such that instead of single vectors V that are shown in FIG. 2 stripes S are solidified, wherein one of these stripes is shown in FIG. 4. There, one stripe S consists of single vectors v that are in parallel to each other and are running perpendicularly to the longitudinal direction of the stripe. The acceleration phase 20 and the deceleration phase 30 of the laser beam lie outside of the region of the stripe that is to be exposed. During these phases the laser is off. A layer is solidified via a plurality of parallel stripes (not shown). The direction R of the stripes that is defined by the direction of movement of the laser beam changes in subsequent layers each time by 67°.

The tensile strength and the elastic limit of tensile specimens that have been manufactured from a metallic powder using this exposure pattern is increased with respect to an exposure, in which the direction of the stripes is changed from layer to layer by 90°.

In a further modification instead of exposing a single layer with a plurality of parallel vectors as it is shown in FIG. 2, a double exposure is performed such that additionally to a first exposure with a first group of parallel vectors $V_I$ a second exposure with a second group of parallel vectors $V_{II}$, which have a certain angle, preferably 90°, with respect to the first group, is performed. Thereby, a cross hatch pattern results, as it is shown in FIG. 5. In the subsequent second layer this pattern is rotated by 67° above the pattern of the previous layer and in each subsequent layer it is each time rotated again by 67°.

In a modification that is shown in FIG. 6 the center of rotation D lies within the contour K of a region to be solidified.

The invention is not limited to the angle $\alpha$ being exactly 67°. Rather, the exposure direction is changed from layer to layer, such that the orientation of the exposure vectors or the stripes is repeated only after a plurality of layers or not at all. An angle of approximately 67° is particularly preferable. Moreover, an angle, which is no whole-number part of 360°, is preferable. Also preferable is an angle that does not have a common whole-number divisor with 360° different from 1.

In a further modification the angle, by which the vectors or stripes are rotated when exposing a subsequent layer, is not constant from layer to layer. The angle can also be determined by a random generator, wherein preferably a minimum angle is set, for example 20°.

In a further modification it is not the whole layer that is exposed with continuous stripes. Rather, partial regions are exposed, wherein the stripes of the partial regions can have an angle with respect to the stripes of adjacent partial regions, usually 90°. For instance, a checkerboard exposure is conceivable. In the subsequent layer for each partial region the direction of all stripes is rotated by the angle $\alpha$.

The invention can principally be applied to all existing exposure patterns.

Modifications of the device are possible. For instance, instead of the deflection of the laser beam also the support can be moved in a corresponding manner, particularly rotated, so that the exposure pattern is generated with respect to a fixed beam by the movement of the support. Alternatively, also the deflection device can be rotated.

Moreover, the invention is also applicable to other layer-wise manufacturing methods. For instance, stereolithography, in which a light-setting resin is solidified, rapid manufacturing methods using either liquid building material or building material in powder form, which use an electron beam source or another particle beam source as energy source, and the three-dimensional printing, in which the building material in powder form is solidified by a jet of an adhesive that serves as solidifying energy beam, belong to these methods. Moreover, also the application in the so-called FDM method (fused deposition modeling) is conceivable, wherein the material is applied onto a support or a previously solidified layer in an extruded shape and the extruded shapes are joined to a continuous object by melting and thus are solidified.

The vectors and the stripes or the extruded shapes from the solidifiable material of the previously mentioned embodiments do form solidification lines. However, the invention is not limited to these examples. The solidification lines can also consist of points, e.g. by using a pulsed laser. The solidification lines need not be straight, but may also have a curvature.

The invention claimed is:

1. Method for manufacturing a three-dimensional object by successively solidifying layers of a building material at positions in the respective layer corresponding to the cross-section of the object, wherein at least a partial region of a layer is solidified such that a pattern is generated that contains a plurality of substantially parallel solidification lines (V, S), and at least a partial region of a subsequent layer is solidified such that a pattern is generated, which contains a plurality of substantially parallel solidification lines that are rotated with respect to the substantially parallel solidification lines of the pattern of the previous layer by an angle ($\alpha$) that differs from 180°, 90° and 45°, wherein each solidification line forms a stripe (S) and wherein the stripe (S) contains a plurality of adjoining vectors (V) that are extending transversely to the longitudinal direction of the stripe (S).

2. Method for manufacturing a three-dimensional object by successively solidifying layers of a building material at positions in the respective layer corresponding to the cross-section of the object, wherein at least a partial region of a layer is solidified such that a pattern is generated, which pattern contains a plurality of first substantially parallel solidification lines (V, S), and at least a partial region of a subsequent layer is solidified such that a pattern is generated, which pattern contains a plurality of second substantially parallel solidification lines that are rotated with respect to the substantially parallel solidification lines of the pattern of the previous layer by an angle ($\alpha$), such that the solidification lines of a respective partial region are running again substantially parallel to the first substantially parallel solidification lines after at least five subsequent layers.

3. Method according to claim 1, wherein the partial regions of subsequent layers are lying one above the other.

4. Method according to claim 1, wherein the angle ($\alpha$) is selected such that after at least approximately 18 layers an orientation of the pattern occurs that differs by less than approximately 10° from an orientation that has already occurred.

5. Method according to claim 2, wherein the angle ($\alpha$) is selected such that after at least approximately 18 layers an orientation of the pattern occurs that differs by less than approximately 10° from an orientation that has already occurred.

6. Method according to claim 1, wherein the angle (α) is constant across the building height of the object to be formed.

7. Method according to claim 1, wherein the angle (α) is determined at random from layer to layer.

8. Method according to claim 7, wherein the angle (α) between two subsequent layers is larger than a predetermined minimum angle which is larger than about 20°.

9. Method according to claim 1, wherein the solidification lines are rotated around a center of rotation (D) that lies outside of the cross-section of the object in the respective layer.

10. Method according to claim 1, wherein the solidification lines are rotated around a center of rotation (D) that lies within the cross-section of the object in the respective layer.

11. Method according to claim 1, wherein a solidification line consists of at least one vector (V).

12. Method according to claim 2, wherein a solidification line consists of at least one vector (V).

13. Method according to claim 2, wherein a solidification line forms a stripe (S).

14. Method according to claim 13, wherein one stripe (S) contains a plurality of adjoining vectors (v) that are extending transversely to the longitudinal direction (R) of the stripe.

15. Method according to claim 1, wherein the solidification lines are straight.

16. Method according to claim 1, wherein within a layer a repeated solidification is performed.

17. Method according to claim 2, wherein within a layer a repeated solidification is performed.

18. Method according to claim 1, wherein the solidification is effected by means of an energy source, wherein the energy source is selected from the group consisting of a laser, an electron beam source, and a heat source.

19. Method according to claim 1, wherein the material is a material in powder form selected from the group consisting of a metal powder, a plastic powder, a ceramics powder, a plastic-coated ceramics powder, a plastic-coated sand powder, and a mixture of powders.

20. Method according to claim 6, wherein the angle (α) is about 67°.

* * * * *